(12) United States Patent
Delia et al.

(10) Patent No.: US 8,712,049 B2
(45) Date of Patent: *Apr. 29, 2014

(54) SYSTEM FOR IMPLEMENTING DYNAMIC PSEUDORANDOM KEYBOARD REMAPPING

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1515 days.

This patent is subject to a terminal disclaimer.

(21) Appl. No.: 11/853,263

(22) Filed: Sep. 11, 2007

(65) Prior Publication Data

US 2009/0070595 A1 Mar. 12, 2009

(51) Int. Cl.
*H04L 9/00* (2006.01)
(52) U.S. Cl.
USPC .............. 380/255; 380/268; 380/43; 713/189
(58) Field of Classification Search
USPC .................. 713/189–194; 341/23; 380/28
See application file for complete search history.

(56) References Cited

U.S. PATENT DOCUMENTS

| 6,971,016 | B1 | 11/2005 | Barnett |
| 7,296,233 | B2 | 11/2007 | Tan et al. |
| 7,596,701 | B2 | 9/2009 | Varghese et al. |
| 7,607,023 | B2 * | 10/2009 | Nakamura et al. ............ 713/189 |
| 7,664,960 | B1 | 2/2010 | Clubb |
| 8,006,300 | B2 | 8/2011 | Mizrah |
| 8,180,051 | B1 * | 5/2012 | O'Toole, Jr. .................. 380/255 |
| 8,230,482 | B2 | 7/2012 | Peterson et al. |
| 2002/0126841 | A1 * | 9/2002 | Arai ............................... 380/46 |
| 2003/0131266 | A1 | 7/2003 | Best et al. |
| 2004/0080529 | A1 | 4/2004 | Wojcik |

(Continued)

FOREIGN PATENT DOCUMENTS

| EP | 1447734 A2 | 8/2004 |
| EP | 1770575 A1 | 4/2007 |
| WO | 2006033531 A1 | 3/2006 |

OTHER PUBLICATIONS

Kelly R. Norman, "Encryption of Computer Peripheral Devices", Apr. 2006, School of Technology Brigham Young University, pp. 1-117.*

(Continued)

*Primary Examiner* — Edward Zee
*Assistant Examiner* — Chi Nguy
(74) *Attorney, Agent, or Firm* — Cantor Colburn LLP

(57) ABSTRACT

A system for implementing dynamic pseudorandom keyboard remapping includes a keyboard in communication with an operating system of a computing device; the keyboard configured to encrypt an original keyboard scan code corresponding to each of a plurality of keyboard keys, using a mapping algorithm, wherein the mapping algorithm encrypts the original keyboard scan code by using both the original keyboard scan code and a current one of a sequence of pseudorandom numbers generated using a pseudorandom number generator (PRNG) algorithm and an initial seed value; and the operating system configured to decrypt the original keyboard scan code based on an encrypted scan code generated and transmitted from the keyboard thereto, responsive to a keystroke of the keyboard, wherein the operating system also uses the mapping algorithm, the PRNG algorithm, and the initial seed value.

4 Claims, 3 Drawing Sheets

(56) References Cited

U.S. PATENT DOCUMENTS

| | | |
|---|---|---|
| 2004/0117632 A1 | 6/2004 | Arling et al. |
| 2005/0071282 A1 | 3/2005 | Lu et al. |
| 2006/0101128 A1 | 5/2006 | Waterson |
| 2007/0089164 A1 | 4/2007 | Gao et al. |
| 2008/0184036 A1 | 7/2008 | Kavsan |
| 2010/0023750 A1* | 1/2010 | Tan .............................. 713/150 |

OTHER PUBLICATIONS

P. Kitsos, G. Kostopoulos, N. Sklavos and O. Koufopavlou. "Hardware Implementation of the RC4 Stream Cipher", 2004, IEEE, pp. 1-4.*

QFX Products, [online]; [retrieved on Jun. 7, 2007]; retrieved from the Internet http://www.qfxsoftware.com/products.htm.

PCT Search Report; PCT/EP2008055554; Mailed: Aug. 18, 2008.

* cited by examiner

SYSTEM FOR IMPLEMENTING DYNAMIC PSEUDORANDOM KEYBOARD REMAPPING

CROSS REFERENCE TO RELATED APPLICATIONS

The present application is co-pending with the concurrently filed application, entitled "METHOD FOR IMPLEMENTING DYNAMIC PSEUDORANDOM KEYBOARD REMAPPING," assigned to the assignee of the present application, the contents of which are incorporated herein by reference in their entirety.

BACKGROUND

The present invention relates generally to computer network security and, more particularly, to a system for implementing dynamic pseudorandom keyboard remapping.

Keylogging is a technological process of monitoring computer activity by recording, transmitting, and examining the characters typed on a computer keyboard. This technique is sometimes used by employers monitoring employee productivity, typically involving clerical tasks. Other, more nefarious implementations of keylogging programs involve espionage, such as those embodied in spyware programs. These programs attempt to gather confidential information, such as a text string including an account name and password, and particularly a text string of keyboard strokes following input of a particular web site address. For example, a mouse click on a web browser icon displays the configured home page. A keyboard is used to enter a secure banking web site URL in the address input box. Following that, an account number and password are keyed in to the respective input fields. The keystrokes entered on the keyboard are recorded by a malicious spyware program, and that sequence of keystrokes is sent to an unknown third party for possible fraudulent use.

Keylogging programs, once installed and activated on a computer system, are extremely difficult to detect. Commercial and freeware spyware detection programs are available, but they are only useful against identified threats listed in the anti-spyware definitions file. However, new and more recent variations of spyware keylogger programs may not be identified by standard anti-spyware detection programs.

Keylogging programs or hardware devices generally work on the principle of detecting basic input/output system (BIOS) signals sent from what is assumed to be a standard keyboard layout (e.g., "QWERTY", "DVORAK", or other standard international keyboard layouts). Windows Vista and other popular operating systems and application software enable "re-mapping" of a computer keyboard. While this technique may thwart keyloggers, it is largely unused by the majority of computer users because the remapped keyboard departs from what is traditionally coordinated with the "muscle memory" of touch typists familiar with standard keyboard layouts. Other solutions to thwart keylogging involve displaying a keyboard on a monitor, from which input letters are selected with the mouse to enter the alphabetic and numeric characters in the input fields into the web form area which is used to contain the password. A variation of this method is to copy and paste the confidential information from a file. However, such approaches carry the risk of being defeated by hackers through the use of capturing and transmitting screen shots of completed forms, which are then analyzed for the confidential information.

Accordingly, it would be desirable to be able to provide an improved method and system for thwarting unauthorized keylogging attempts.

SUMMARY

The foregoing discussed drawbacks and deficiencies of the prior art are overcome or alleviated by a system for implementing dynamic pseudorandom keyboard remapping. In an exemplary embodiment, the system includes a keyboard in communication with an operating system of a computing device; the keyboard configured to encrypt an original keyboard scan code corresponding to each of a plurality of keyboard keys, using a mapping algorithm, wherein the mapping algorithm encrypts the original keyboard scan code by using both the original keyboard scan code and a current one of a sequence of pseudorandom numbers generated using a pseudorandom number generator (PRNG) algorithm and an initial seed value; and the operating system configured to decrypt the original keyboard scan code based on an encrypted scan code generated and transmitted from the keyboard thereto, responsive to a keystroke of the keyboard, wherein the operating system also uses the mapping algorithm, the PRNG algorithm, and the initial seed value.

In another embodiment, a computer program product includes a computer readable computer program code for implementing dynamic pseudorandom keyboard remapping of a system including a keyboard in communication with an operating system of a computing device; and instructions for causing a computer to implement a method, the method further including encrypting an original keyboard scan code corresponding to each of a plurality of keyboard keys, using a mapping algorithm, wherein the mapping algorithm encrypts the original keyboard scan code by using both the original keyboard scan code and a current one of a sequence of pseudorandom numbers generated using a pseudorandom number generator (PRNG) algorithm and an initial seed value; and decrypting the original keyboard scan code based on an encrypted scan code generated and transmitted from the keyboard to the operating, responsive to a keystroke of the keyboard, wherein the operating system also uses the mapping algorithm, the PRNG algorithm, and the initial seed value.

BRIEF DESCRIPTION OF THE DRAWINGS

Referring to the exemplary drawings wherein like elements are numbered alike in the several Figures.

DETAILED DESCRIPTION

Disclosed herein is method and system for thwarting unauthorized keylogging attempts through implementing dynamic pseudorandom keyboard remapping. Briefly stated, the embodiments herein incorporate hardware and software components of a BIOS (Basic Input/Output System) within a computer system. The keyboard of the computer system is equipped with a small amount of PRAM (Parameter Random Access Memory) and a hard-wired logic chip which is programmed to calculate subsequent values of a pseudorandom sequence of keyboard scan code mappings. Upon system power up, an initial seed value (e.g., an integer) is sent from the operating system to the keyboard. The initial seed value (which is itself randomly or pseudorandomly generated as discussed below) is then used by pseudorandom number generator (PNRG) function in the keyboard to produce a sequence of pseudorandom numbers that are used (along with actual scan codes from keystrokes) as inputs to a preselected, predefined logic function of arbitrary complexity or simplicity. The preselected logic function is also used by the keyboard to produce an encrypted, remapped array of character scan codes output from the keyboard.

Concurrently, the identical preselected logic function and PRNG are also executed within the computer's operating system. The nature of a PRNG is that a string of apparently random numbers is generated; however, two sequences of pseudo-random numbers will be identical if they are generated with the same algorithm starting with the same initial seed value. While this is seen as a weakness with respect to the capability of generating legitimate, true random numbers, the ability of PRNGs to produce the same sequence of random numbers is advantageously used in the present embodiment to keep the keyboard and the operating system synchronized. The next value of the pseudo-random number sequence is calculated by algorithm following each keystroke, and resulting remappings of the keyboard scan code table are functionally established.

In other words, the keyboard scan code table maintained on the keyboard is translated (i.e., encrypted) after each character key pressed, while the keyboard scan code table maintained in the computer operating system is translated in the exact same manner by using the same initial seed value, PRNG algorithm and mapping algorithm. Thereby, the operating system has the ability to decrypt each encrypted keystroke scan code received from the keyboard. Moreover, since the encryption (mapping) algorithm executed by the keyboard logic uses both the actual keystroke scan code and the present pseudorandom number sequence value as inputs, the encryption itself is not static for all keystrokes, and can theoretically be different with each successive keystroke.

Figure 1A:
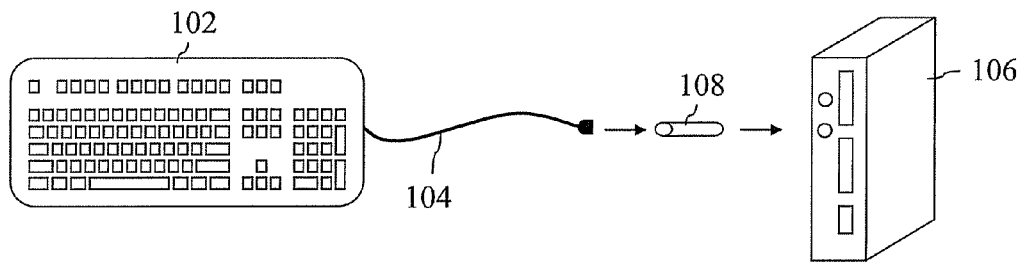
FIG. 1(a) is a schematic diagram illustrating the susceptibility of a conventional computer system to a hardware-based keylogging intrusion.

Referring initially to FIG. 1(a), there is shown a schematic diagram illustrating the susceptibility of a conventional computer system 100a to a hardware-based keylogging intrusion. In particular, a keyboard 102 is connected through a cable 104 to a computing device 106. In addition, FIG. 1(a) further illustrates a hardware-based keylogging device 108 which may be surreptitiously installed between the keyboard 102 and the computing device 106, wherein the keylogging device 108 collects keyboard scan codes transmitted from the keyboard to the central processing unit (CPU) of the computing device. The collected scan codes may then recovered by a third party (authorized or not) to determine what keys on the keyboard were struck.

Figure 1B:
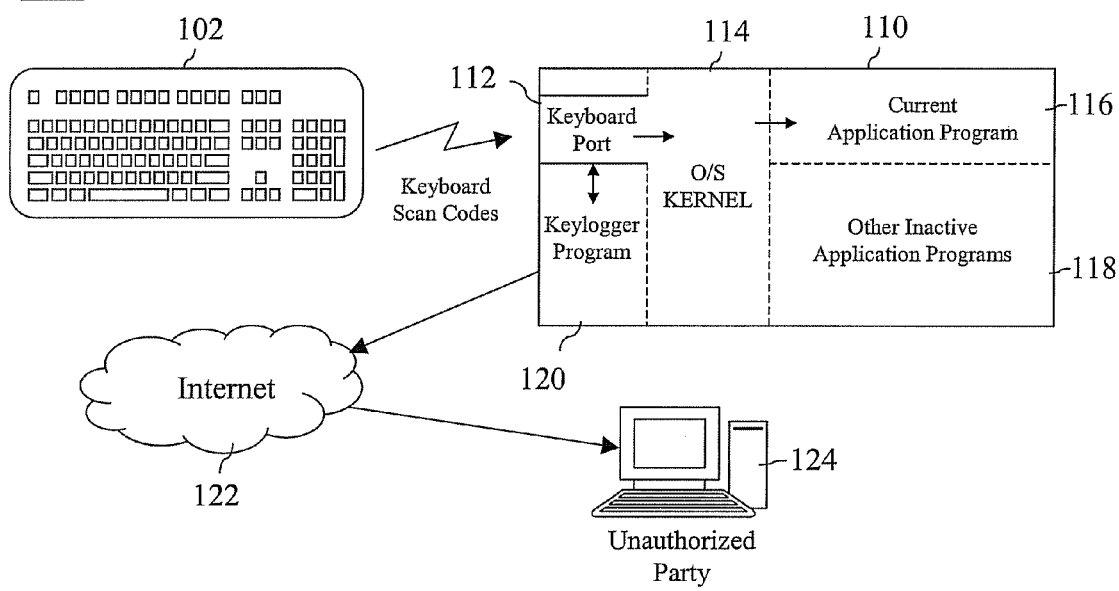
FIG. 1(b) is a schematic diagram illustrating the susceptibility of a conventional computer system to a software-based keylogging intrusion.

Alternatively, FIG. 1(b) is shown a schematic diagram illustrating the susceptibility of another conventional computer system 100b to a software-based keylogging intrusion. In this example, the keyboard 102 is a wireless device, although it could also be connected to the computing system by cable. In FIG. 1(b), the CPU 110 of the computing device is depicted as a logical view of the partitioning thereof, wherein a keyboard port 112 receives the input keyboard scan codes (whether wireless or wired) and transmits the same to the operating system (O/S) kernel 114 running the current application program 116. Other inactive application programs 118 are also illustrated. As further illustrated in FIG. 1(b), a keylogger program 120 residing within the computing device is also in communication with the keyboard port. In this manner, the keyboard scan codes can then be transmitted over a network (e.g., the Internet) so as to be accessible by a device 124 belonging to an unauthorized third party.

Figure 2A:
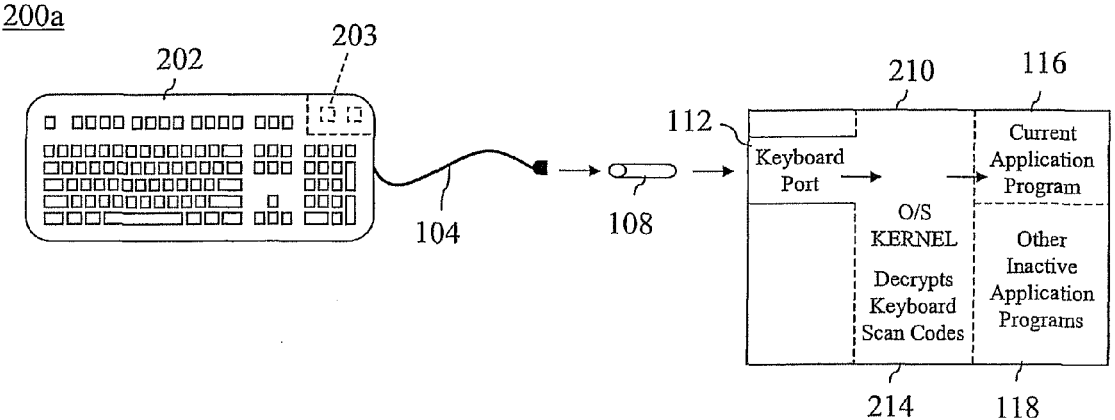
FIG. 2(a) is a schematic diagram illustrating a system for thwarting unauthorized keylogging attempts with respect to the hardware-based keylogging intrusion of FIG. 1(a), in accordance with an embodiment of the invention.
Figure 2B:
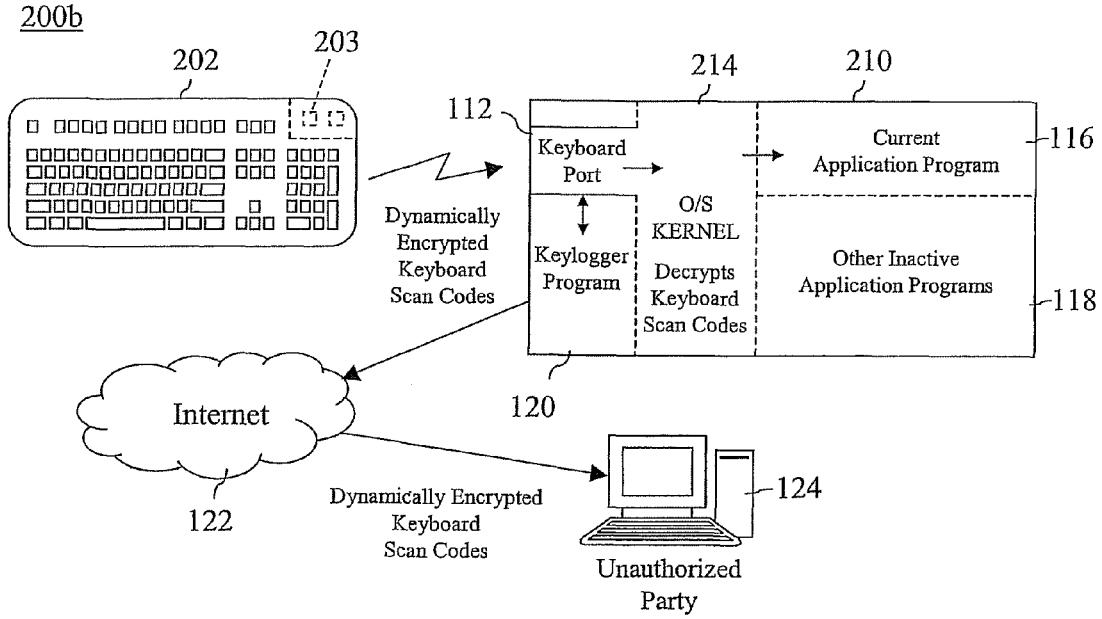
FIG. 2(b) is a schematic diagram illustrating a system for thwarting unauthorized keylogging attempts with respect to the software-based keylogging intrusion of FIG. 1(b), in accordance with a further embodiment of the invention.

Accordingly, FIGS. 2(a) and 2(b) are schematic diagrams illustrating a system for thwarting unauthorized keylogging attempts with respect to the hardware and software-based keylogging intrusions of FIGS. 1(a) and 1(b), respectively, in accordance with an embodiment of the invention. As shown in FIG. 2(a), computer system 200a includes a modified keyboard 202 having one or more hard-wired memory and logic chips 203 (including a sufficient amount of PRAM) so as to allow the keyboard 202 to asynchronously communicate with the BIOS in the computer operating system 214. As described in further detail below, the communication between the operating system 214 allows the logic 203 of the keyboard to use a initial seed transmitted from the operating system 214 and generate dynamically encrypted pseudorandom keyboard scan codes. Thus, even where the hardware keylogging device records the dynamically encrypted scan codes, a hacker is unable to decipher the scan codes without three pieces of information: (1) the initial seed value; (2) the PRNG algorithm used to generate a pseudorandom number sequence and (3) the combination algorithm used to encode the actual scan codes, which used both the scan code corresponding to the struck key and the current pseudorandom number in the generated sequence. However, since both the keyboard logic 203 and the operating system 214 have these three pieces of information, the CPU 210 can readily decode the dynamically encrypted keyboard scan codes.

Correspondingly, computer system 200b also includes the modified keyboard 202 having the memory/logic circuitry 203 as described above. Accordingly, even where a keylogger program 120 is installed within the computing device, a hacker receiving the random, dynamically generated scan codes on device 124 over a network (e.g., the Internet 122) cannot decipher the codes without the initial seed value, PRNG algorithm and combination algorithm.

Figure 3:
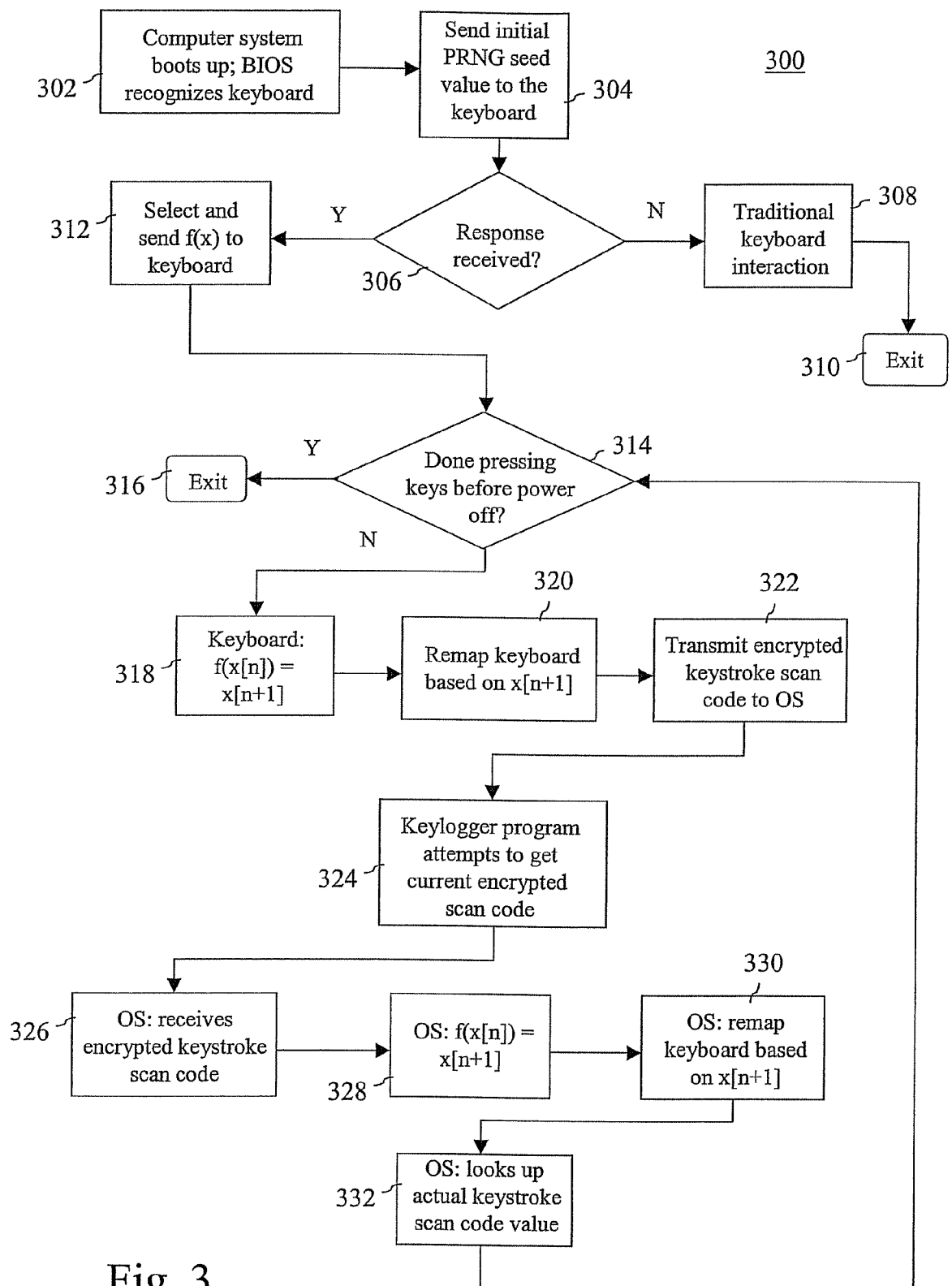
FIG. 3 is a flow diagram illustrating a method for thwarting unauthorized keylogging attempts through implementing continuous pseudorandom keyboard remapping, in accordance with a further embodiment of the invention.

Referring now to FIG. 3, there is shown a flow diagram illustrating a method 300 for thwarting unauthorized keylogging attempts through implementing continuous pseudorandom keyboard remapping, in accordance with a further embodiment of the invention. As shown in block 302, the computer system (e.g., system 202a, 202b) boots up, during which time the BIOS of the system recognizes the connection of the keyboard (e.g., keyboard 202) and determines whether the anti-keylogging capability is present on the keyboard. In the embodiment depicted, this is done by sending an initial PRNG seed value ($x_0$) to the keyboard as shown in block 304. The initial seed value may itself be pseudorandomly generated by, for example, using a time stamp of the system clock. If at decision block 306 an appropriate response is not received from the keyboard, then a traditional keyboard interaction is assumed at block 308, then the process exits at block 310.

On the other hand, if the anti-logging capability is present on the keyboard, the method proceeds to block 312, where a PRNG algorithm function is selected from a set of different available algorithms, and transmitted from the computer operating system to the PRAM in the keyboard. Decision block 314 and block 316 represent an exit condition for the dynamic pseudorandom keyboard remapping process, which continues so long as keys continue to be pressed while system power remains on.

When the first key is pressed, the selected PRNG algorithm function f(x) is applied to the initial seed value $x_0$, in the keyboard as follows: $f(x_0)=x_1$. Stated more generally, $f(x[n])=x[n+1]$, as shown in block 318. The pseudorandomly generated value $x_1$ is then used to create a remapping of the scan code table in the keyboard, as shown in block 320. Thus, the encrypted scan code for the pressed key is a function of the scan code and the value $x_1$. In block 322, the encrypted scan code value is transmitted from the keyboard to the operating system.

Once transmitted, any keylogging attempts (e.g., hardware or software based) will result in a hacker's access of only dynamically encrypted scan codes as shown in block 324. In the meantime, the operating system receives the encrypted scan code value at block 326. Because the operating system has the initially transmitted seed value $x_0$, it can also generate $x_1$ from the initial seed value $x_0$ using the same PRNG function f(x) used by the keyboard, as generally reflected in block 328. Furthermore, the operating system also remaps the keyboard using the same remapping function (illustrated in block 320) as shown in block 330.

Finally, as shown in block 332, the operating system decrypts the actual keystroke scan code value since it has knowledge of the mapping algorithm and the current pseudorandom number in the generated sequence used to encrypt the scan code. Thereafter, the process returns to decision block 314 and to block 318 if more keys are to be pressed, in which case another pseudorandom number is generated using the PRNG.

Accordingly, the resulting string of scan codes is completely randomized. Because of the randomization of the scan code table following each keystroke (synchronized at both the keyboard and the computer operating system), the sequence of scan codes cannot be decoded to interpret the typed characters to extract any sensitive, confidential, or classified information. However, as the characters are passed from the keyboard to the operating system one at a time, the intended characters are successfully transmitted to the operating system.

By way of illustration, if the scan code for the characters A, B, C are 64, 65, and 66 respectively on a specific keyboard layout, then an unencrypted character string of "ABCABC" would be transmitted as scan codes 64-65-66-64-65-66 from the keyboard to the computer. With a simple, static encryption scheme, the scan codes could be encrypted such that the actual scan code of one character is mapped to a different scan code (e.g., A=17; B=43; C=27). However, with a simple static approach, the same translated scan code for the letter A would be used each time the A key is struck. Thus, a statically encrypted scan code for "ABCABC" might be transmitted as 17-43-27-17-43-27. While this is better than unencrypted scan codes, such statically encrypted scan codes are still susceptible to decryption if accessible by keylogging methods.

In contrast, through the present invention embodiments, the same exemplary "ABCABC" character string could result in a set of six completely different scan codes, wherein the remapping of the keyboard thus prevents any decoding of the actual sequence of keys pressed, since the one-to-one relationship between scan codes and particular characters is no longer necessary. This feature completely defeats any physical or logical keylogger strategies which may be affecting the computer system.

In summary, the present approach is based on two separate mathematical functions executed in both the keyboard logic chip and the computer workstation operating system: $f(x_n)=x_{n+1}$, which is the PRNG function, and $g(s_0, x_n)=s_n$, which translates the original keyboard scan code of a particular character key into a decodable remapping of the scan code using the current value in the PRNG function $f(x_n)$. As indicated above, the PRNG function $f(x_n)$ can be any one of several different well known and frequently used pseudorandom number generators, such as for example, linear congruential generators, lagged Fibonacci generators, linear feedback shift registers, and generalized feedback shift registers. Recent instances of PRNG functions include "Blum Blum Shub," Fortuna, and the Mersenne twister. It should be appreciated that the exact PRNG function used is not important, as long as the following rules are in effect:

1. The sequence of numbers produced by the PRNG appears to be random, but in fact is a completely determined sequence starting from the original seed value.

2. The same original seed value is used to start the sequences on the keyboard and the operating system.

3. The same PRNG function is used on both the keyboard and the operating system.

The keyboard scan code remapping function is an algorithm that encodes the transmitted value of the scan code sent from the keyboard to the operating system. In an exemplary embodiment, this mapping algorithm selected and sent from the operating system to the keyboard may change each time the computer is rebooted. The function $g(s_0, x_n)$ maps the original, unencrypted scan code value ($s_0$) of the pressed character key into a new scan code value decodable in the operating system. The mapping algorithm can also be arbitrarily selected from a plurality of several available algorithms stored in system memory and sent to the keyboard when the computer operating system initializes. One specific example of a decodable remapping function is $g(s_0, x_n)=2*s_0+x_n+17$, which will be used in the following exemplary illustration of the above described process.

It is first assumed that a PRNG function is chosen such that the first eleven elements of the pseudo-random number sequence produced from an original seed value $x_0$ are: 14, 71, 36, 88, 7, 16, 52, 79, 21, 74, 40. Again, this pseudorandom sequence is produced by both the keyboard and the operating system, since both have knowledge of the PRNG algorithm and the initial seed value. Further, it is assumed that the original (unencrypted) scan code table values for the character keys "a" through "z" are 1, 2, 3, . . . 26, with the space bar having the original scan code value 0. Finally, it is assumed that the character string "wayne delia" is typed into the keyboard, which represents five letters, a space, and five more letters.

The "w" key is the first key pressed on the keyboard. As indicated above, the first number of the exemplary PRNG sequence ($f(x_0)=x_1=14$) is calculated by the keyboard from the initial seed value and the PRNG algorithm. The actual scan code $s_0$ corresponding to the letter "w" is 23. Therefore using the first generated PRN and the original scan code for "w" as inputs to the formula $s_1=g(s_0, x_n)=2*s_0+x_n+17$, the resulting remapped code for this first keystroke becomes: (2*23)+14+17=77. This remapped scan code is transmitted to the operating system. Upon receipt of the remapped scan code, the operating system executes the same PRNG algorithm to the same initial seed value $x_0$ transmitted on the keyboard, arriving at the value $f(x_0)=x_1=14$. The encoded scan code received from the keyboard is $s_1=77$. This remapped scan code is "decoded" by solving for $s_0$ where $s_1 = 2*s_0 + x_n + 17$. Thus, $77 = 2*s_0 + 14 + 17$; $2*s_0 = 46$; $s_0 = 23$, which translates from the original scan code table as the character "w."

By applying the same process to each of the eleven keys in the character string, the following exemplary results are achieved as illustrated below in Table 1:

TABLE 1

| Key seq | Char key pressed | $s_0$ (scan code val) | $x_n$ PRNG value | Kbd: $s_n =$ $g(s_0, x_n)$ | OS: $s_0 =$ $g^{-1}(s_n, x_n)$ | Char rec'd by OS |
|---|---|---|---|---|---|---|
| 1 | w | 23 | 14 | 77 | 23 | w |
| 2 | a | 1 | 71 | 90 | 1 | a |
| 3 | y | 25 | 36 | 103 | 25 | y |
| 4 | n | 14 | 88 | 123 | 14 | n |
| 5 | e | 5 | 7 | 34 | 5 | e |
| 6 | (blank) | 0 | 16 | 33 | 0 | (blank) |
| 7 | d | 4 | 52 | 77 | 4 | d |
| 8 | e | 5 | 79 | 106 | 5 | e |
| 9 | l | 12 | 21 | 62 | 12 | l |
| 10 | i | 9 | 74 | 109 | 9 | i |
| 11 | a | 1 | 40 | 59 | 1 | a |

PRNG algorithm: $f(x_n) = x_n + 1$
Remapping function: $g(s_0, x_n) = 2*s_0 + x_n + 17$
Decoding function: $g^{-1}(s_n, x_n) = (s_n - x_n - 17)/2$ As indicated above in Table 1, the first column "key seq" represents the key sequence order and the second column "Char key pressed" represents the actual key struck on the keyboard. The third column represents the original, unencrypted scan codes corresponding to the struck keys on the keyboard, which are sought to be protected from keylogging efforts. The fourth column represents the successive pseudo-random number sequence that is generated by both the keyboard and the operating system. The fifth column in Table 1 corresponds to the resulting encrypted scan codes for each keystroke, using the original scan code $s_0$, the pseudorandom number $x_n$ and the mapping algorithm $g(s_0, x_n)$.

Thus, any physical keylogging devices or software keylogging programs present in the computing system will only detect the transmitted sequence of each of the n keystroke scan codes $s_n$ listed in the fifth column of Table 1, which appears to be completely random from a hacker's perspective. The sixth column of the table represents the application of the decoding function, $g^{-1}$, by the operating system to the dynamically encrypted codes of the fifth column, wherein the decoding function is the algebraic inverse of the remapping function, g, used in the keyboard, sent from the operating system at boot-up.

As will be particularly noted from a comparison between the original scan code values (third column) and the encrypted scan code values, two different scan codes are generated and transmitted for the same character key "e" (scan code 34 for the letter "e" on the fifth keystroke, and scan code 106 for the letter "e" on the eighth keystroke). A similar situation is seen for the second and eleventh keystrokes, which both strike the letter "a," wherein two different values for encrypted scan codes are generated. This will prevent hackers from breaking a static mapping code by cryptographic strategies, in which the same scan code is always used for the same character key. Moreover, it will also be noticed in the exemplary sequence that it is possible for keystrokes of two different keys to generate the same encoded scan value. For example, the first keystroke "w" produces an encrypted scan code value of 77, while the seventh keystroke "d" also produces the same encrypted scan code value of 77, thereby making the process even more robust.

Although the exemplary embodiments described herein may include the remapping of the entire keyboard following each key stroke, such an operation may result in significant overhead and performance burdens, particularly on a small-footprint database and logic chip embedded in the keyboard. Thus, additional exemplary embodiments contemplated herein provide that a remapping of every character is not necessary, so long as a retention of the original scan code table values and a calculation of the next element in the sequence of pseudo-random numbers originating from a common starting seed value is enabled.

As should be appreciated, exemplary the default scan code table values and PRNG sequence numbers presented herein are only for simplistic illustration. Actual scan codes and pseudo-random number sequence elements may be (and most likely will be) much different. Notwithstanding, the PRNG and remapping algorithm examples discussed herein will correctly handle any numeric scan codes.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for implementing dynamic pseudorandom keyboard remapping, comprising:
   a keyboard in communication with an operating system of a computing device;
   the operating system configured to send an initial pseudorandom number generator (PRNG) seed value, $x_0$, to the keyboard, and to determine whether a response to the initial PRNG seed value $x_0$ is received from the keyboard by the operating system, and in the event a response is received, the operating system is configured to send a selected PRNG algorithm, f(x), to the keyboard;
   the keyboard configured to apply the selected PRNG algorithm f(x) to the initial PRNG seed value $x_0$ so as to generate a first pseudorandomly generated value, $x_1$, responsive to a first keystroke received by the keyboard;
   the keyboard further configured to encrypt an original keyboard scan code corresponding to each of a plurality of keyboard keys, using a mapping algorithm, wherein the mapping algorithm encrypts the original keyboard scan code by using both the original keyboard scan code and the first pseudorandomly generated value, $x_1$, and transmits an encrypted scan code to the operating system such that each keystroke is encrypted with a different decodable remapping function; and the operating system further configured to decrypt the original keyboard scan code from the encrypted scan code generated by the keyboard, wherein the operating system also uses the same mapping algorithm used by the keyboard, the same PRNG algorithm f(x) sent to and used by the keyboard, and the same initial seed value $x_0$ sent to and used by the keyboard;

wherein the keyboard is further configured to, for each subsequent keystroke received by the keyboard following the first keystroke, generate subsequent pseudorandom numbers using the selected PRNG algorithm f(x) and a previous generated pseudorandom number in accordance with the expression $f(x[n])=x[n+1]$, wherein the mapping algorithm encrypts the original keyboard scan code by using both the original keyboard scan code and a current one of the subsequent pseudorandom numbers.

2. The system of claim 1, wherein the keyboard further comprises one or more logic devices and one or more parameter random access memory (PRAM) devices for executing both the PRNG algorithm and the mapping algorithm.

3. The system of claim 1, wherein the operating system generates and transmits the initial seed value to the keyboard upon system power up.

4. The system of claim 1, wherein the operating system decrypts the encrypted scan code transmitted from the keyboard by applying an inverse function with respect to the mapping algorithm, using the current value of the pseudorandom numbers generated using the PRNG algorithm, and solving for the value of the original keyboard scan code.

* * * * *